United States Patent [19]
Mahlein et al.

[11] Patent Number: 4,637,682
[45] Date of Patent: Jan. 20, 1987

[54] BRANCH CONNECTOR FOR LIGHT WAVEGUIDES

[75] Inventors: Hans F. Mahlein; Achim Reichelt, both of Unterhaching; Gerhard Winzer, Munich, all of Fed. Rep. of Germany

[73] Assignee: Siemens Aktiengesellschaft, Berlin and Munich, Fed. Rep. of Germany

[21] Appl. No.: 246,100

[22] Filed: Mar. 20, 1981

[30] Foreign Application Priority Data

Mar. 28, 1980 [DE] Fed. Rep. of Germany ....... 3012184

[51] Int. Cl.[4] .......................... G02B 6/26; G02B 6/42
[52] U.S. Cl. .................................. 350/96.15
[58] Field of Search .......................... 350/96.15, 96.16

[56] References Cited

U.S. PATENT DOCUMENTS

| 4,130,345 | 12/1978 | Doellner ........................... 350/96.15 |
| 4,165,496 | 8/1979 | Di Domenico, Jr. et al. ... 331/94.5 S |
| 4,244,045 | 1/1981 | Nosu et al. ............................. 370/3 |

OTHER PUBLICATIONS

Mahlein et al., "Interference Filter All-Fibre Directional Coupler for W.P.M" Electronics Letters, 17 Jul. 1980, vol. 16, #15.
K. Kobayashi et al., "Micro-Optic Devices for Fiber-Optic Communications", *Fiber and Integrated Optics*, vol. 2, No. 1, 1979, pp. 1-17.
T. Miki et al., "Viabilities of the Wavelength-Division-Multiplexing Transmission System Over an Optical Fiber Cable", *IEEE Transactions on Communications*, vol. Com-26, No. 7, 1978, pp. 1082-1087.
K. Nosu et al., "Multireflection Optical Multi/Demultiplexer Using Interference Fibers", *Electronics Letters*, vol. 15, No. 14, Jul. 5, 1979, pp. 414-415.

*Primary Examiner*—William L. Sikes
*Assistant Examiner*—Robert E. Wise
*Attorney, Agent, or Firm*—Hill, Van Santen, Steadman & Simpson

[57] ABSTRACT

A branch connector for light waveguides which utilizes a beam divider mirror characterized by a carrier member aligning a pair of light waveguides on a common axis, a beam divider which is arranged on a plane slanted to the common axis on an angle which is larger than 45 degrees and is positioned between the ends of the waveguides and flush therewith and a second carrier plate mounting an additional waveguide adjacent one of the pair of aligned waveguides on a second axis extending at an angle to the common axis and intersecting the common axis at the beam divider mirror with the second axis being oriented to receive light reflected along the given direction.

6 Claims, 10 Drawing Figures

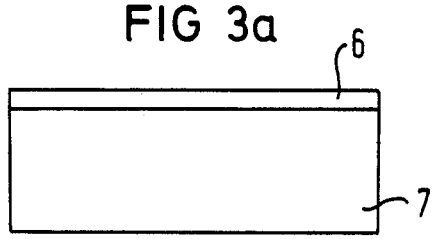
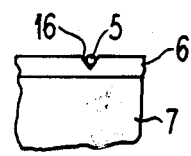
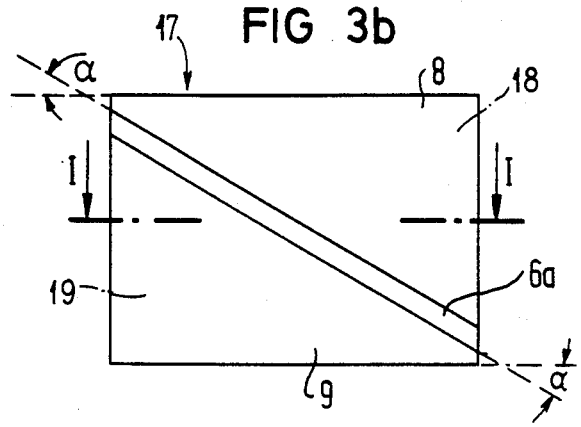
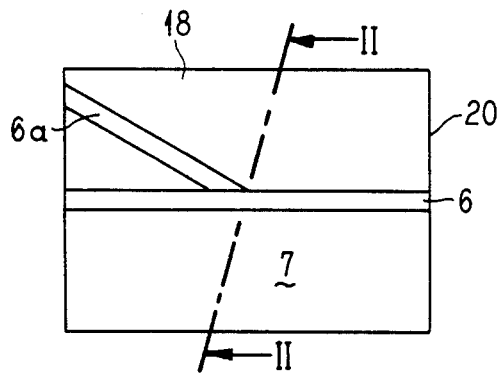
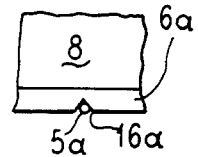
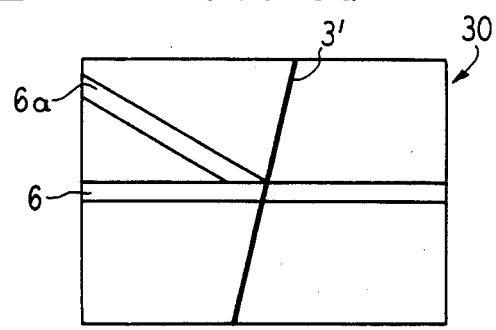

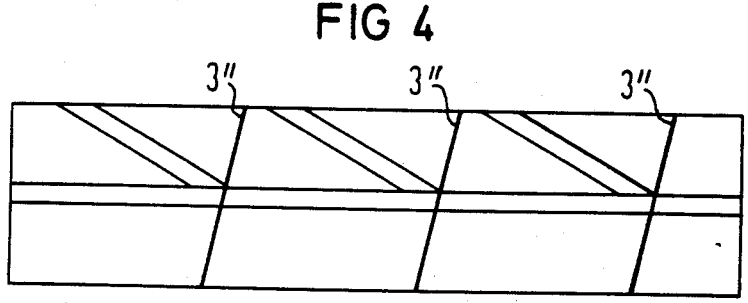
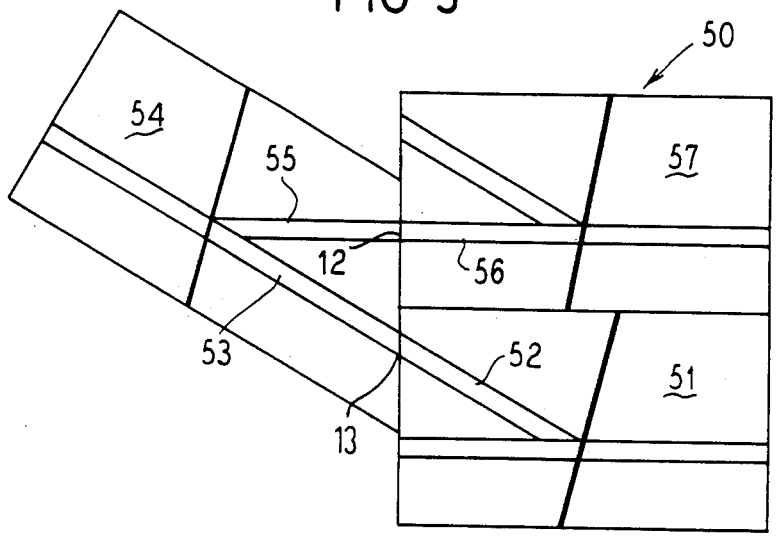

BRANCH CONNECTOR FOR LIGHT WAVEGUIDES

BACKGROUND OF THE INVENTION

The present invention is directed to a branch connector for light waveguides which connector utilizes a beam divider principal. The connector comprises a pair of light waveguides on a common axis; a beam divider, which is arranged on a plane slanted to the common axis and extends between the ends of the waveguides which are flushed therewith, to reflect a beam traveling parallel to the common axis along a given direction, and at least one additional waveguide adjacent one of the pair of aligned waveguides on a second axis extending at an angle to the common axis and intersecting the common axis at the beam divider mirror with the second axis being oriented to extend along the given direction.

Branch connectors of the above mentioned type have already been proposed in optical communications for use as optical multiplexers and demultiplexers. These branch connectors have been proposed in various compact structural shapes which do not require lenses. Their characterstic features are the use of the beam divider principal with a spectrally selective beam divider mirror instead of the conventional beam divider mirror. It has turned out that in the case of the spectrally selective beam divider mirror with an angular radiation of incidence, the polarization effect occurs which becomes larger as the angle of incidence becomes larger. These polarization effects limit the channel spacing which is obtainable with the branch connector. Articles in *IEEE Transactions on Communications*, Vol. Com-26, No. 7, July, 1978, pages 1082–1087; *Fiber Integr. Opt.*, 2, 1979, page 1, and *Electronics Letters*, Vol. 15, No. 14, July, 1979, pages 414 and 415, disclose the work of various Japanese groups which use complicated arangements with lenses and reduce the disturbing polarization effect by means of using almost perpendicular radiation incidence or radiation incidence of small angles.

SUMMARY OF THE INVENTION

The present invention is directed to providing a branch connector for light waveguides which utilizes the beam divider principal and which has reduced polarization effects without requiring the use of lenses.

This task is accomplished by an improvement in a branch connector for light waveguides utilizing the beam divider principal, said connector comprising means aligning a pair of light waveguides on a common axis, a beam divider mirror being arranged on a plane slanted to the common axis and extending between the ends of the waveguides which are flushed therewith, said beam divider mirror reflecting a beam of light traveling parallel to the common axis along a given direction, and means for mounting at least one additional waveguide adjacent one of the pair of aligned waveguide on a second axis extending at an angle to the common axis and intersecting said common axis at the beam divider mirror, said second axis being oriented to extend along the given direction. The improvement comprises the beam divider mirror being inclined toward the common axis at an angle $\beta$, with the angle $\beta$ being larger than 45 degrees.

This surprisingly simple and apparently obvious solution leads to a significant advantage. The polarization effects are reduced to such an insignificant degree that in most of the practical cases, they can be disregarded. Thus, the simple structure is preserved which has been successful in the structure with the mirror being inclined towards the common axis at an angle of 45 degrees. The preservation of the basic concept of the structure, however, has the further result that the proposed branched connector can be just as easily manufactured as those branch connectors with the beam divider mirror inclined at 45 degrees. The proposed branch connector can thus be manufactured just as cheaply and in mass production as the previously known connectors.

As in the case of the previously known connectors, the improved branch connector uses glass fibers as the light waveguides and thus above all, both the customary core-cladded glass fibers and also gradient index fibers can be used. So that the radiation, which is reflected at the beam divider mirror, is not reflected back into the feeding fiber but rather can penetrate its sheath or cladding and then proceed into the additional light waveguide, additional conditions must be fulfilled in the proposed branch connector, which conditions are that the angle $\beta$ also satisfies the condition $$\arcsin(A_N/n_0) < \beta < 90° - \arcsin(A_N/n_0),$$

wherein $A_N$ signfies the numerical aperture of the light waveguide and $n_0$ signfies the index of refraction on the axis of the light waveguide. This additional condition as a rule can be easily fulfilled.

It can however also be advantageous to proceed by removing the cladding from the one waveguide at the location of the contact with the additional waveguide. However, the additional waveguide must engage the one aligned waveguide, which is advantageous and practical in most cases. It is also desirable that the end face of the additional waveguide be on a plane which is slanted to the axis of the waveguide and is parallel to the common axis of the aligned waveguides. These last two features are favorable features for most cases.

In view of the ability to produce branch connectors as proposed hereinabove, it is as simple and practical as possible to form embodiments in which the means for mounting the aligned pair is a carrier body which mounts a plurality of aligned pairs which have equal spacing and extend parallel to one another and the means for mounting the additional waveguide is a carrier body which mounts a plurality of additional waveguide all extending parallel to each other at the same spacing so that an additional waveguide is aligned with each of the aligned pairs and the one beam divider mirror is common with each of the aligned pairs. It is also possible to subdivide either one of the pair of aligned waveguides by an additional beam divider mirror and to provide this additional beam divider mirror with further waveguides which extend on an axis for receiving light reflected by the additional beam divider mirror which is also at an angle other than 45 degrees with the fibers. In this additional case, a plurality of elements can be formed side-by-side.

All manufacturing methods, which are known and which have been proposed in connection with light waveguide branch connectors with a beam divider mirror which was inclined at 45 degrees to the aligned pair of waveguides, can be used in the proposed branched connector. The only changes would be due to the newly determined angle of inclination of the guide grooves with respect to one another and the necessary changes of the inclination of the cut edges of the relative carrier bodies.

BRIEF DESCRIPTION OF THE DRAWINGS

FIGS. 3a-3d show significant method steps in the manufacture of the branch connector in accordance with FIG. 2 with FIG. 3a being a side view of a carrier member, FIG. 3aa being a partial end view of the carrier member of FIG. 3a, FIG. 3b being a side view of the carrier member for an additional waveguide, FIG. 3bb being a partial end view of the carrier member in 3b, FIG. 3c showing portions of the two carrier members joined together, and FIG. 3d being a side view of the completed branch connector;

FIG. 4 is a side view illustrating a cascade of branch connectors wherein several beam dividing mirrors separate several aligned light waveguides from one another; and FIG. 5 shows an arrangement of three branch connectors wherein an aligned light waveguide which leads from one beam divider mirror toward a second beam divider mirror becomes an additional light waveguide for the second beam divider mirror and the additional waveguide of the one beam divider mirror becomes an aligned flush light waveguide for a third beam divider.

DESCRIPTION OF THE PREFERRED EMBODIMENTS

Figure 1:
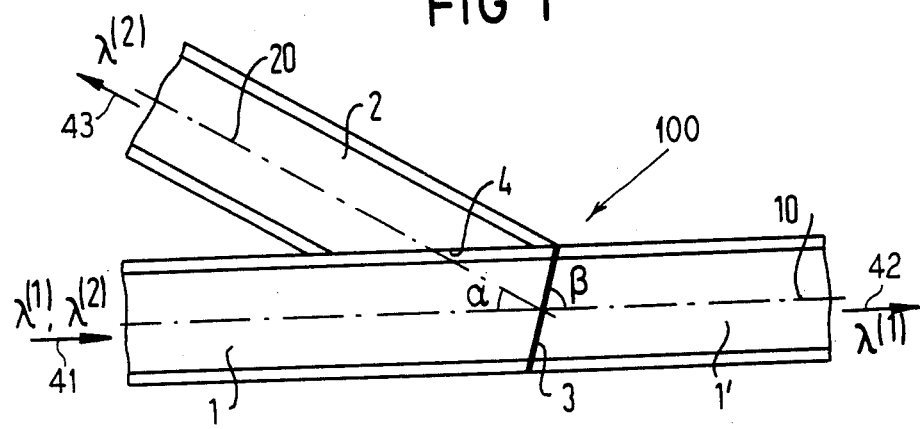
FIG. 1 is a schematic simplified presentation of the branch connector of the present invention.

The principles of the present invention are particularly useful in a branch connector generally indicated at 100 in FIG. 1. The connector 100 includes a pair of core-cladded fiber 1 and 1', which are aligned on a common axis 10. The two glass fibers 1 and 1' are separated from one another by means of a beam divider mirror 3 which is arranged on a plane slanted relative to the common axis 10. The beam divider mirror 3 is spectrally selective beam divider mirror, for example an optical cut-off filter. The branch connector 100 according to FIG. 1 is illustrated with the plane of the beam divider mirror 3 being perpendicular to the drawing plane so that only a trace of the mirror 3 is visible. It can be seen from FIG. 1, that the angle $\beta$ by which the mirror 3 is inclined to the common axis 10 is larger than 45 degrees which means that the mirror is inclined relatively steeply towards the common axis 10.

A light beam traveling in the direction of arrow 41 in the waveguide 1 along the axis 10 will strike the mirror 3 whereby a portion will pass through the mirror into the waveguide 1' as indicated by the arrow 42. Another portion is reflected by the mirror 3 in the direction as indicated by arrow 43 along a dot-line 20 which line 20 cuts the common axis 10 at the mirror 3 and forms an angle $\alpha$ with the axis 10, which angle $\alpha$, as illustrated, is less than 90°.

Adjacent to the glass fibers 1 and 1', and slanted with respect to them is an additional core-cladded glass fiber 2 which is an additional light waveguide. This additional glass fiber 2 is to be arranged so that its axis extends parallel to the line 20 and preferably the axis of the fiber 2 coincides with the line 20.

In the manufacture of the branch connector illustrated in FIG. 1, one should attempt to have the axis of the additional light waveguide 2 coincide with the line 20 to the greatest extent possible. In practice, however, this is possible only within allowable working tolerances which can be relatively large. The same applies in general for the aligned pairs of glass fibers 1 and 1'. Therefore, when the terms or statements aligned waveguides, common axis, intersection of the two axes in a point and orienting the axis in a specific direction are used, this signifies that these apply within allowable work tolerances. Within these tolerances, relative displacement and inclinations are allowable. In the device of FIG. 1 the ideal case is depicted that is the line 20 is simultaneously the the axis of the additional fiber 2 and is thus also designated as such in the following.

An end face 4 of the additional fiber 2, which end face is turned towards the pair of aligned fibers 1 and 1', is cut or provided with a slanted surface and specifically in such a manner that the end face 4 lies in a plane that extends parallel to the common axis 10 of the aligned fibers 1 and 1'. Thus, favorable relationships are created for the coupling over of the reflected beam into the additional fiber 2.

The branch connector 100 can be used as a multiplexer or as a demultiplexer for two wavelengths $\lambda^{(1)}$ and $\lambda^{(2)}$. With $\lambda^{(1)}$ is designated as a wavelength which will pass through the mirror 3 whereas the $\lambda^{(2)}$ is reflected by the mirror 3. If the mirror 3 for example is a short wave transmitting cut-off filter, then the wavelength $\lambda^{(1)}$ is shorter than the wavelength $\lambda^{(2)}$. If the mirror 3 is a long wavelength transmitting cut-off filter, then the wavelength for $\lambda^{(1)}$ is longer than the wavelength $\lambda^{(2)}$.

In FIG. 1, the laws of refraction are disregarded. The sheath or cladding of the fiber 1 has an index of refraction which is lower than the index of refraction for the core of the fiber. Thus, a light being reflected by the mirror is refracted at the inner face or boundary layer between the core and the cladding. The second refraction proceeds at the transition from the cladding of the fiber 1 to the core of the additional fiber 2. If the cores of the fibers 1 and 2 have the same index of refraction, then the reflected axial beam continues in the core of the additional fiber 2 in the same direction as in the core of the fiber 1. If this is not the case, then the axis of the fiber 2 would have to be oriented in the direction in which the reflected beam would spread in the case of the assumption of a different core index of refraction of the fiber 2.

So that the radiation approaching from the left in the fiber 1 which is reflected at the mirror 3 is not reflected back into the fiber 1 but rather penetrates its cladding and can proceed into the additional fiber 2, the angle $\beta$ must additionally satisfy the following condition:

$$\text{arc sin } (A_N/n_0) < \beta < 90° - \text{arc sin } (A_N/n_0)$$

wherein $A_N$ signfies the numerical aperture of the fiber and $n_0$ signifies its index of refraction on the axis.

For the fiber types which are of interest at the present time, there results the following maximum permitted values for the angle $\beta$:

| Fiber Type | $A_N$ | $n_0$ | $\beta_{max}$ |
| --- | --- | --- | --- |
| Gradient fiber | 0.18 | 1.46 | 83° |
| Thick core fiber | 0.4 | 1.6 | 73.5° |

If the glass fiber cladding of the fiber 1 or 1' causes interference at the location of the contact with the additional fiber 2, then it can be partially or completely etched away.

Figure 2:
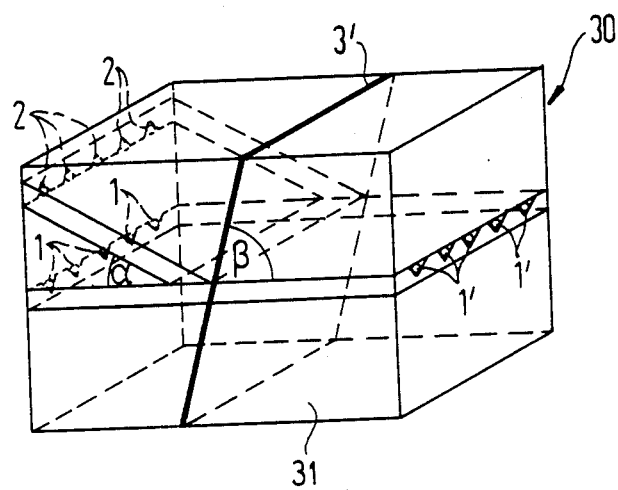
FIG. 2 is a perspective view of a plurality of branch connectors arranged next to one another in accordance with the present invention.

In FIG. 2 a practical construction of several branch connectors according to FIG. 1 is illustrated and generally indicted at 30. The device 30 includes a carrier body 31 which forms means for aligning several pairs of glass fibers 1 and 1' along common axes which are parallel to one another and lie in the same plane. The aligned fibers 1 and 1' of each pair are separated by one common mirror layer 3' which also is arranged in the device 30. The mirror layer 3' forms an angle $\beta$ with the plane in which the pairs of aligned glass fibers lie. Several additional glass fibers 2 are arranged next to one another in the device 30 to lie in a different plane and to extend parallel to one another. The additional glass fibers 2 in each case meet a pair of aligned glass fibers 1 and 1' with the plane of the additional glass fibers forming an angle $\alpha$ with the plane of the aligned pairs and intersecting the plane of the aligned pairs in the mirror layer 3'. The angle $\alpha$ is determined by the angle $\beta$ and is an angle between a beam traveling in the aligned waveguides 1 and the reflected beam by the mirror 3'.

The device 30 can be formed by the method steps which are illustrated in FIGS. 3a–3d. In the first step, a silicon sheet such as 6, (FIGS. 3a and 3aa) is anisotropically etched to form V-shaped grooves 16 in which the glass fibers such as 5 are cemented. In a similar manner, a silicon sheet 6a has V-shaped grooves 16a formed in a surface and fibers 5a are cemented therein. The silicon sheet 6 is cemented to a glass plate 7 in such a manner that the furrow side or the side having the groove 16 is turned away from the plate. Thus, the initial part shown in FIGS. 3a and 3aa is created. As illustrated in FIG. 3b, a pair of glass prisms 8 and 9 which have surfaces extending at an angle $\alpha$ are provided and arranged with the sheath 6a cemented therebetween. This forms an initial part 17 (FIGS. 3b) with the grooved side of the silicon sheet 6a is facing the prism 9. The initial part 17 is cut on a plane formed by the lines I—I into two parts 18 and 19. After the cutting step, the cut surfaces of the upper part 18 are polished. The upper part 18 with its polished surface is cemented to the sheet 6 specifically in such a manner that the glass fibers 5a which lie in parallel grooves 16a meet and engage the glass fibers 5 which also lie in parallel grooves 16 to produce the unit or immediate part 20 of FIG. 3c. The part 20 is then cut along a plane II—II to form two parts whose cut surfaces are then polished. Then a partially permeable mirror layer 3' is applied. This layer may be applied for example, by a vacuum deposition process of a wavelength-selective dielectric multilayer system. The two parts are then brought together in the final stages illustrated in FIG. 3d and cemented to form the part 30 with the waveguides aligned on common axes. The part containing the sheet 6a with the fibers 5a corresponds to the fibers 2 in FIG. 2 and the aligned fibers 5 in the sheath 6 corresponding to the aligning pairs of fibers 1 and 1'.

If the part 30 of FIG. 3d is cut by means of vertical cuts which extend parallel to the sheet of the drawing between the pair of aligned fibers, then individual branch connectors such as illustrated in FIG. 1 will be obtained. With the method just described, ten to twenty branch connectors or more can be manufactured without difficulty. It is important that in the case of the above method, that the grooves in the two silicon sheets 6 and 6a are manufactured with the same method.

In FIG. 4, a cascade of three branch connections similar to those of FIG. 3d are illustrated. Losses occur in the transmitting channels only at each of the beam divider mirrors 3''. As illustrated, the fibers extending on the common axis have been subdivided into subwaveguides by the beam divider mirrors 3'' and each of the beam divider mirrors 3'' has been provided with an additional waveguide extending at an angle therefrom.

Several branch connectors are arranged in reflection, for example, as illustrated in FIG. 5 as a device generally indicated at 50. A first connector 51 has an additional waveguide 52 which is connected at 13 to one of the aligned waveguides 53 of second connector 54. An additional waveguide 55 of the connector 54 is connected at 12 to one of the aligned waveguides 56 of a third connector 57. In this device 50, additional losses cannot be avoided at the transition points such as 12 and 13 between the reversals of the orientation of the V-shaped grooves which will occur.

Through a combination of arrangements depicted in both FIGS. 4 and 5, a tree-like structure can be obtained which is particularly desirable for use as a multiplexer and/or demultiplexer. It should be noted that in all complex arrangements, for reasons of space, it is practical to work with fiber tips or tails.

Although various minor modifications may be suggested by those versed in the art, it should be understood that we wish to embody within the scope of the patent granted hereon, all such modifications as reasonably and properly come within the scope of our contribution to the art.

We claim:

1. In a branch connector for light waveguides utilizing a beam divider principle, said connector comprising means aligning a pair of light waveguides on a common axis, a beam divider mirror being arranged on a plane slanted to the common axis and extending between the ends of the waveguides which are flush therewith, said beam divider mirror reflecting a beam traveling parallel to the common axis along a given direction, and means mounting at least one additional waveguide adjacent one of the pair of aligned waveguides on a second axis extending at an angle $\alpha$ to the common axis and intersecting said common axis at the beam divider mirror, said second axis being oriented to lie in said given direction so that the additional waveguide receives the reflected beam from the beam divider mirror, the improvements comprising means for reducing polarization effects without using lenses, said means for reducing consisting of the beam divider mirror being inclined towards the common axis at an angle $\beta$, said angle $\beta$ being larger than 45° and satisfying the condition $\beta < 90° - \arcsin(A_N/n_0)$, wherein $A_N$ signifies the numerical aperture of the light waveguide and $n_0$ is the index of refraction on the axis of the light waveguide, said angle $\alpha$ being less than 90° and the additional light waveguide having an end face lying in a plane extending at the angle $\alpha$ to the second axis and parallel to the common axis, said end face contacting one of the waveguides of the pair, said waveguides of the pair of waveguides being core-cladded glass fibers with a portion of the cladding of the one waveguide at the location of contact by the end face of the additional waveguide being removed to provide a planer surface for the end face to engage.

2. In a branch connector according to claim 1, wherein said beam divider mirror is spectrally selective with the reflected beam being of a different wavelength from the wavelength of the beam being passed by the mirror.

3. In a beam divider according to claim 1, wherein angle $\beta$ is less than 83°.

4. A branch connector utilizing a beam divider principle, said connector consisting of a pair of main light waveguides having ends; an additional light waveguide having an axis and an end face lying in a plane forming an angle $\alpha$ to said axis, said angle $\alpha$ being less than 90°; a beam divider mirror; means for reducing polarization effects without utilizing lenses; means aligning said pair of main light waveguides on a common axis, said beam divider mirror being arranged on a plane slanted at an angle $\beta$ to the common axis and extending between the ends of the main waveguides which are flush therewith, said means for reducing polarization effects comprising said angle $\beta$ being larger than 45° and satisfying the condition $\beta < 90° - \arcsin(A_N/n_0)$, wherein $A_N$ signifies the numerical aperture of the light waveguide and $n_0$ is the index of refraction on the axis of the light waveguide, said beam divider mirror reflecting a beam traveling parallel to the common axis along a second direction extending at said angle $\alpha$ to the common axis; and means mounting said additional waveguide with the end face extending parallel to the common axis and engaging one of the pair of aligned main waveguides and the additional waveguide extending at said angle $\alpha$ to the common axis being oriented to be in said second direction and intersecting said common axis at the beam divider mirror so that the additional waveguide receives the reflected beam from the beam divider mirror.

5. A branch connector according to claim 4, wherein the beam divider mirror is spectrally selective with the beam being passed by the mirror being of a different wavelength than the reflected beam.

6. A branch connector according to claim 4, wherein the one main waveguide at least in the area contacted by the end face has an outer surface portion removed to form a flat surface for receiving the end face.

* * * * *